Jan. 23, 1968  E. HENRY-BIABAUD  3,365,245
VEHICLE HYDRAULIC BRAKING SYSTEM
Filed Jan. 25, 1965
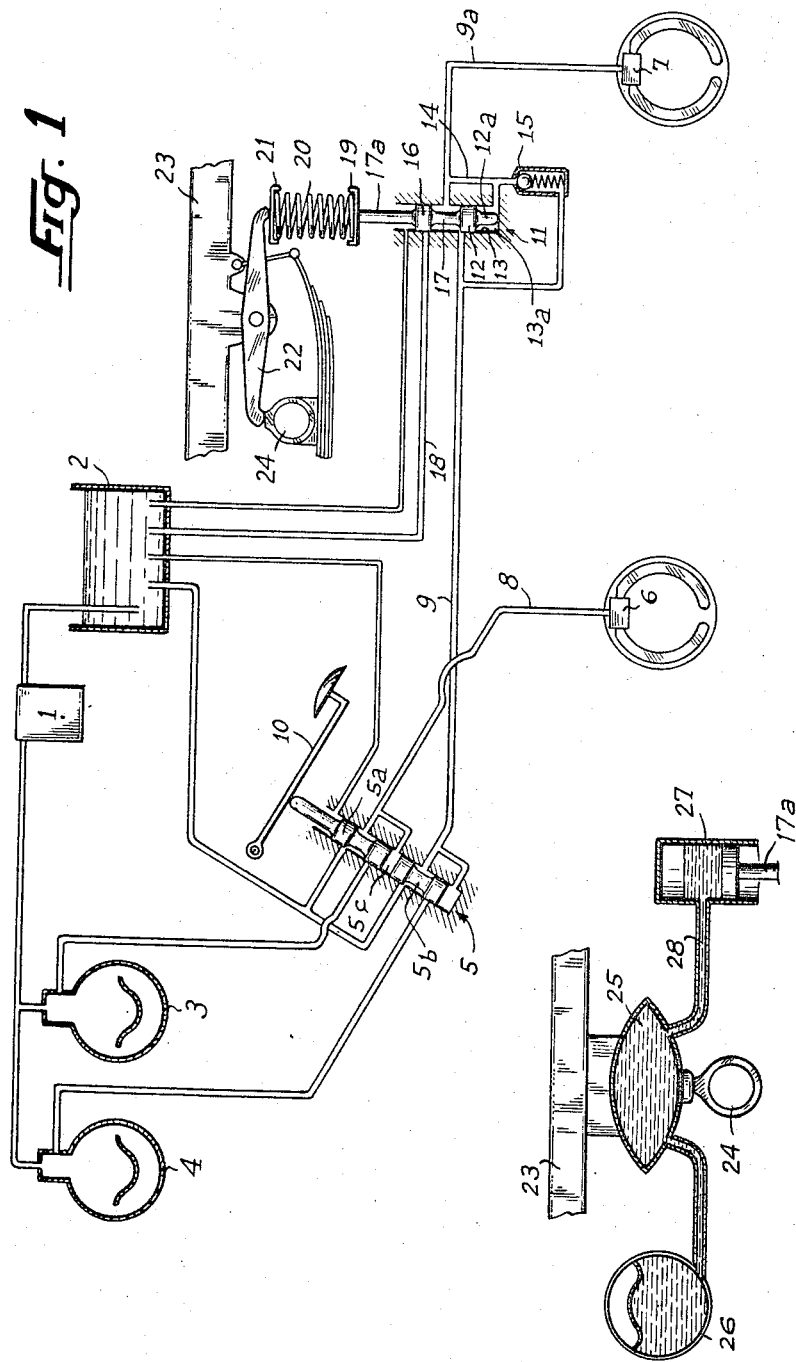

United States Patent Office 3,365,245
Patented Jan. 23, 1968

3,365,245
VEHICLE HYDRAULIC BRAKING SYSTEM
Edmond Henry-Biabaud, Paris, France, assignor to Societe Anonyme Andre Citroen, Paris, Hauts-de-Seine, France, a society of France
Filed Jan. 25, 1965, Ser. No. 427,843
Claims priority, application France, Jan. 24, 1964, 961,423
6 Claims. (Cl. 303—22)

It has already been considered advantageous to adjust the braking force applied to the wheels of a vehicle as a function of the load which it carries, and various devices have been proposed to obtain this result.

However, in certain cases, and particularly in the case of vehicles having large load variations, braking must not only be adjusted as a function of the total load of the vehicle, but also as a function of the load on each axle. In particular, if the load on one of the axles varies by a large proportion, it is desirable that the braking force applied to this axle does not cause the wheels to lock and skid when the load is reduced.

From one aspect, the present invention provides a vehicle hydraulic braking system including at least one accumulator for fluid under pressure and a distributor for supplying the brake cylinders, whereas the braking effect applied to the wheels of an axle of the vehicle is limited as a function of the load carried by that axle. The invention is applicable to one or more axles of a vehicle.

According to the invention, there is applied to a movable control member associated with the pipe system connecting the distributor to the brake cylinders a first force or effort in a direction tending to open the control member, proportional to the load carried by the axle under consideration, and a force or effort opposite the first and proportional to the pressure in the brake cylinders.

It is an object of the invention to provide a braking device for use in the system previously defined, which comprises, in combination, a valve associated with the pipe system connecting the master cylinder and the brake cylinders, a stop determining the open position of said valve, a flexible connecting member interposed between said valve and an element sensitive to the load supported by the axle, said connecting member holding the valve supported on its stop, and a hydraulic jack supplied in parallel with the brake cylinders and operatively or kinematically connected to said valve.

In order that the invention may be more readily understood, one embodiment thereof will now be described with reference to the accompanying drawings, in which:

FIGURE 1 is a diagram of a braking system according to this embodiment of the invention;

FIGURE 2 is a diagram showing a modified flexible connecting member acting on the valve in a direction which tends to open the latter.

Referring firstly to FIGURE 1, a braking system or installation comprises essentially a hydraulic pump 1 drawing hydraulic fluid from a reservoir 2 feeding it at a high pressure into accumulators 3 and 4 which serve respectively the front and rear brake actuating members such as jacks or cylinders 6 and 7. The accumulators 3 and 4 are connected by means of a distributor 5, to the said brake cylinders 6 and 7.

In this embodiment, the distributor 5 comprises two pipe systems 8 and 9, respectively intended to feed the front brake cylinders 6 and the rear brake cylinders 7. The distributor 5 itself comprises two slides 5a and 5b, the slide 5a being directly connected to and controlled by a brake-pedal 10, while the slide 5b is normally controlled by the pressure which is established after a certain passage of the slide 5a in the intermediate space 5c. In the pipe 9 feeding the rear brake cylinders 7 is arranged a control valve generally designated by 11 and constituted in the example shown, by a piston 12 working in a cylinder 13, into which are connected the pipe 9, and also a pipe 9a feeding the cylinders 7. The lower part of the piston 12 is provided with an axial extension 12a which is capable of abutting the lower surface of the cylinder 13. In this position, as shown in the drawing, the piston 12 uncovers the end of the pipe 9, the control valve thus being open and the pipes 9 and 9a being connected together.

When the axial extension 12a abuts the lower surface of the cylinder 13, the piston 12 defines with the cylinder 13 a chamber 13a into which a pipe 14 opens, which pipe 14 is connected in parallel with the pipe 9a. This pipe 14, moreover, is provided with a safety valve 15, the return of which may be connected, as shown, to the pipe 9.

The piston 12 is rigidly connected to a second piston 16 by means of a rod 17 having a smaller cross-section than the pistons, the rod 17 defining with the cylinder 13 an annular space into which the pipe 9a opens. A pipe 18 for returning hydraulic fluid to the reservoir 2 also opens into the cylinder 13. It should be noted that the distance, axially separating the openings of the pipes 9 and 18 in the cylinder 13, is approximately equal to the length of the rod 17 for reasons which will appear hereafter. However, from now on, it is important to note that the construction of the valve 11 may be substantially different from that which has just been described. In particular, the two pistons 12 and 16 may be replaced by other types of valves, provided that they are operatively interconnected in a suitable way. The rod 17 is extended beyond the piston 16 by means of a rod 17a terminated by a stop ring 19 receiving the end of a spiral compression spring 20. The spring 20 is located at its upper end in a stop ring 21, on which one of the ends of a balancing lever or rocker 22 is supported, said lever being pivotally mounted on the chassis 23 of the vehicle, the other end of the lever 22 being located on and engaging the rear axle 24.

In the embodiment shown, the valve 11 is mounted on an element fixed to or integral with the chassis 23, but it is obvious that it may instead be mounted on an element fixed to or integral with the axle 24.

The operation of the system is as follows:

When braking is effected, the pressure transmitted through the pipe 9 to the brake cylinder 7 also acts in the chamber 13a. When this pressure exerts on the piston 12 a force balancing the action of the spring 20, the piston rises and closes the end of the pipe 9, limiting the braking pressure applied to the cylinder 7 to a valve which is proportional to the compression of the spring 20, and therefore to the load on the axle 24.

It may thus be seen that if the force exerted on the pedal 10 is moderate, the pressure applied to the brakes will be the same for all of the vehicle axles, and braking will itself be moderated. However, if a high pressure is applied to the brakes by a heavy application of the pedal, the cylinders 7 of the axle with which the device according to this embodiment is associated will receive only a limited pressure, by reason of the displacement of the piston 12, and the limited pressure will be lower when the loading on the axle is less.

However, it is important to note that the upward displacement of the piston 12, which seals or closes the pipe 9, may be accompanied, if it is large, by a corresponding displacement of the piston 16 which is sufficient to uncover the end of the pipe 18 connected to the reservoir 2. Thus, when during braking, the load on the axle 24 and consequently on the spring 20 momentarily decreases either by reason of the condition or inclination of the road or by reason of a displacement of the centre of gravity of the vehicle load a certain quantity of the hydraulic braking fluid may be evacuated to the reservoir, which enables any untimely locking of the wheels to be avoided.

Although the above described embodiment is one in which the suspension of the vehicle is arranged so that relative movement takes place between the chassis and the axle as a function of the load, the invention may also be applied to a suspension of the pneumatic or hydropneumatic type which enables the chassis to be maintained at a constant height above the ground, whatever the load which it carries may be.

For example, FIGURE 2 diagrammatically shown a modified element sensitive to the load of the vehicle as well as a modified flexible connecting member which connects this element to the control valve.

Between the axle 24 and the chassis 23 is in fact arranged a bellows or similar element 25 supplied with a fluid under pressure from an accumulator 26. Conventional means (not shown) enable the distance between the axle 24 and the chassis 23 to be kept constant by modifying the pressure existing within the bellows 25 as a function of the load supported by the vehicle.

In this case, the rod 17a of the control valve 11 is fixed to or integral with one of the elements, namely the piston or the cylinder, of a ram or jack 27 supplied by a pipe 28 connected to the circuit under pressure of the suspension system of the vehicle.

A spring similar to the spring 20 may be arranged between the rod 17a and the jack 27, although it is not indispensable in the case where a pneumatic cushion or cushioning is provided either in the jack 27 itself, in the chamber 25, or in any other suitable place, the cushion giving a degree of elasticity to the connection between the rod 17a and the jack 27, which elasticity is, as previously mentioned, considered to be necessary to enable the movement of the piston 12. In fact, the functioning of the device shown in FIGURE 2 is quite similar to that which has been described previously.

The invention is not limited to the embodiments which have previously been described, and it will be understood that various modifications may be made without departing from the scope of the present invention as defined in the appended claims.

I claim:

1. A hydraulic braking system for a vehicle having two axles each provided with brake actuators for braking the wheels on the respective axles, comprising a source of hydraulic fluid under pressure, two separate circuits for fluid under pressure extending from said source to said brake actuators of the respective axles, each of said circuits having interposed therein a fluid pressure accumulator and a distributor operable selectively to direct fluid under pressure from the respective accumulator to the respective brake actuators and to return fluid from said respective actuators to said source, means including a single foot pedal to operate said distributors of the two circuits in tandem, and a device interposed in one of said circuits to limit the braking forces applied by the respective brake actuators in dependence on the load applied to the associated axle, said device including means to block the supplying of fluid under pressure through said one circuit to the respective brake actuators whenever the ratio of the load on said associated axle to the braking forces applied by said respective actuators is less than a predetermined value and normally blocked return means which is opened to return fluid under pressure from said respective brake actuators to said source only when said ratio is less than said predetermined value by a predetermined amount.

2. A hydraulic braking system according to claim 1; wherein said one circuit is associated with the brake actuators of the rear axle of the vehicle.

3. A hydraulic braking system according to claim 1; wherein said device includes a cylinder in communication with said respective actuators and having first and second axially spaced ports for receiving fluid under pressure from the respective distributor and for returning fluid under pressure to said source, respectively, and first and second pistons spaced axially by a distance less than the spacing between said ports and movable together in said cylinder from an extreme position where said first piston clears said first port and said second piston closes said second port so as to successively close said first port and open said second port in response to increasing displacements of said pistons from said extreme position.

4. A hydraulic braking system according to claim 3; wherein said device further includes means for urging said pistons away from said extreme position with a force dependent on the braking forces applied by said respective actuators, and means yieldably urging said pistons toward said extreme position with a force dependent upon the load on said associated axle.

5. A hydraulic braking system according to claim 4; wherein said means urging the pistons toward their said extreme position includes resiliently flexible mechanical means acting on said pistons in the direction toward said extreme position, and means stressing said resiliently flexible mechanical means in accordance with the load on said respective axle so that the force applied by said resiliently flexible mechanical means is proportionate to said load.

6. A hydraulic braking system according to claim 4; wherein said means urging the pistons toward their said extreme position includes hydraulic circuit means terminating in an hydraulic actuator connected with said pistons and being responsive to the load on said associated axle to apply a corresponding force to said pistons in the direction toward said extreme position, said hydraulic circuit means including a pressure accumulator containing a compressible fluid to permit movement of said pistons away from said extreme position by said force dependent on the braking forces.

References Cited

UNITED STATES PATENTS

| 2,424,913 | 7/1947 | Browall | 303—22 X |
| 2,929,660 | 3/1960 | Brueder | 303—22 |
| 2,987,346 | 6/1961 | Wrigley | 303—22 X |
| 3,152,844 | 10/1964 | Bucler | 303—6 |
| 3,153,560 | 10/1964 | Henry-Biabaud | 303—22 |
| 3,165,363 | 1/1965 | Behles | 303—22 X |

FOREIGN PATENTS

| 1,288,940 | 2/1962 | France. |

EUGENE G. BOTZ, *Primary Examiner.*